(12) United States Patent
Gurley et al.

(10) Patent No.: US 8,425,279 B2
(45) Date of Patent: Apr. 23, 2013

(54) APPARATUS FOR MANUFACTURING SEEDS FOR POLYCRYSTALLINE SILICON MANUFACTURE

(75) Inventors: Larry Gurley, Semmes, AL (US); Ken Rowell, Coden, AL (US); Satoshi Imamura, Yokkaichi (JP); Yukio Yamaguchi, Yokkaichi (JP)

(73) Assignees: Misubishi Polycrystalline Silicon America Corporation (MIPSA), Theodore, AL (US); Mitsubishi Materials Corporation, Tokyo (JP)

( * ) Notice: Subject to any disclaimer, the term of this patent is extended or adjusted under 35 U.S.C. 154(b) by 1240 days.

(21) Appl. No.: 12/241,393

(22) Filed: Sep. 30, 2008

(65) Prior Publication Data
US 2010/0077897 A1    Apr. 1, 2010

(51) Int. Cl.
*B24B 7/00* (2006.01)
(52) U.S. Cl.
USPC ............ 451/69; 451/150; 451/213; 125/13.01
(58) Field of Classification Search ............ 451/65, 451/69, 121, 124, 150, 184, 212, 213; 125/13.01
See application file for complete search history.

(56) References Cited

U.S. PATENT DOCUMENTS

| 4,016,855 | A | * | 4/1977 | Mimata | 125/13.01 |
| 4,187,828 | A | * | 2/1980 | Schmid | 125/18 |
| 4,646,710 | A | * | 3/1987 | Schmid et al. | 125/16.01 |
| 4,727,852 | A | * | 3/1988 | Schmid et al. | 125/16.01 |
| 4,776,316 | A | * | 10/1988 | Ashkenazi | 125/18 |
| 4,903,681 | A | * | 2/1990 | Honda et al. | 125/13.01 |
| 5,586,929 | A | * | 12/1996 | Butcher et al. | 451/213 |
| 6,102,023 | A | * | 8/2000 | Ishiwata et al. | 125/13.01 |
| 6,361,404 | B1 | * | 3/2002 | Ishiwata et al. | 451/41 |
| 2002/0157657 | A1 | * | 10/2002 | Toledano | 125/15 |
| 2002/0160695 | A1 | * | 10/2002 | Osada et al. | 451/41 |

FOREIGN PATENT DOCUMENTS

| JP | 04-36092 A | 12/1992 |
| JP | 2005-112662 A | 4/2005 |

* cited by examiner

*Primary Examiner* — Eileen P. Morgan
(74) *Attorney, Agent, or Firm* — Edwards Wildman Palmer LLP

(57) ABSTRACT

An apparatus for manufacturing seeds for polycrystalline silicon manufacture by cutting a silicon rod in an axial direction into at least one plate-like member, and cutting at least one of the silicon plate-like member lengthwise into seeds that are square in cross section, that includes a table which mounts the silicon rod or at least one of the plate-like member, a pair of end-face supporting members which support the silicon rod or at least one of the plate-like member by pressing both end faces thereof in the axial direction, and a cutting blade which cuts the silicon rod or at least one of the plate-like member in the axial direction, in addition the end-face supporting members includes comb-like grooves that allow the cutting blade to pass through.

5 Claims, 7 Drawing Sheets

APPARATUS FOR MANUFACTURING SEEDS FOR POLYCRYSTALLINE SILICON MANUFACTURE

BACKGROUND OF THE INVENTION

1. Field of the Invention

The present invention relates to an apparatus for manufacturing seeds for polycrystalline silicon manufacture. The apparatus holds silicon rods to be cut into seeds which can be used as silicon core rods when manufacturing polycrystalline silicon.

2. Description of Related Art

The Siemens process is a known method to manufacture polycrystalline silicon using a manufacturing apparatus such as a reacting furnace with an arrangement of numerous seeds of silicon core rods that are heated to manufacture cylindrical rods of polycrystalline silicon. A raw mixed gas of chlorosilane gas and hydrogen gas is introduced into the reacting furnace. The raw mixed gas contacts the heated seeds of silicon core rods causing hydrogen reduction of the raw gas and silicon to precipitate on the seed surfaces by thermal decomposition. The resulting reaction produces cylindrical rods of polycrystalline silicon.

Seeds used in manufacturing polycrystalline silicon are made from silicon or polycrystalline silicon. For example, in Japanese Patent Application No. 4-362092, rod-like and plate-like seeds are made, while in Japanese Patent Application No. 2005-112662, polygonal seeds are cut from a polycrystalline silicon rod.

When manufacturing thin seeds from a cylindrical silicon rod the seeds are cut in this manner: the silicon rod is first sliced along its axis into a plurality of plates, and these plate-like members must then be further cut in an axial direction into thinner widths, usually square in cross section.

SUMMARY OF THE INVENTION

When cutting a silicon rod into plates, the thickness of the cutting blade creates gaps equal to the thickness of the cutting blade between the plate-like members. These gaps can cause the separated plate-like members to tilt or collapse during cutting, resulting in cutting errors or defects in the plates. These cutting errors can lead to a reduction in seed yield or a reduction in seed productivity caused by an interruption of the cutting operation to adjust for the tilt or collapse.

The present invention has been realized in view of the above problems, and aims to provide an apparatus for manufacturing a seed for polycrystalline silicon manufacture that can accurately and speedily cut a silicon rod without tilting, collapsing or damaging the separated plate-like members.

To achieve the above objective, a manufacturing apparatus according to the invention is an apparatus for manufacturing seeds for polycrystalline silicon manufacture by cutting a silicon rod in an axial direction into at least one plate-like member, and cutting at least one of the silicon plate-like member lengthwise into seeds that are square in cross section, and includes a table which mounts the silicon rod or at least one of the plate-like member, a pair of end-face supporting members which support the silicon rod or at least one of the plate-like member by pressing both end faces thereof in the axial direction, and a cutting blade which cuts the silicon rod or at least one of the plate-like member in the axial direction. In addition, the end-face supporting members include comb-like grooves that allow the cutting blade to pass through.

When slicing the silicon rod into plates by cutting it in the axial direction, the cutting blade passes along the grooves in the end-face supporting members which support both end faces of the silicon rod, and at least one of the cut plate-like member are kept in a state of being pressed from both ends by the comb portions of the end-face supporting members. Therefore, even after cutting, at least one of the plate-like member can be prevented from tilting and collapsing.

The manufacturing apparatus according to the invention also includes multi-cutters with horizontally-arranged plurality of cutting blades that can be simultaneously cut a plurality portions arranged at intervals in width direction of at least one of the plate-like members. In addition, the comb-like grooves are provided at the same intervals as the plurality of cutting blades.

When cutting the silicon rod into a plurality of plate-like members by a cutting blade and then cutting the silicon plate-like members lengthwise into seeds, although the seed may be manufactured one by one, by cutting the plate-like members more than once with one cutting blade, the plurality of seeds may be manufactured at the same time by the multi-cutter with the plurality of cutting blades, since the cutting depth of the plate-like members is smaller than that of the silicon rod.

The manufacturing apparatus according to the invention also includes cushion members to be inserted between the silicon rod or at least one of the plate-like member and the end-face supporting members, and the cushion member includes grooves having approximately the same shape as the comb-like grooves. Since these cushion members are provided on both ends of the silicon rod or at least one of the plate-like members, they can reliably absorb vibrations during cutting. Moreover, if the cushion members are made from, for example, pieces of wood, they can be manufactured inexpensively, and can be replaced when they suffer damage and the like.

The manufacturing apparatus according to the invention includes a magnet member that is magnetically attached to the table, and a backing plate member that is inserted between the magnet member and a side face of the silicon rod or at least one of the plate-like member. The magnet member and the backing plate can prevent the silicon rod or the like from vibrating in the left and right directions, and can prevent positional deviation of the silicon rod or the like, damage, and breakage thereof. Since the backing plate member is secured by the magnet member, it can be arranged in an arbitrary position, and can be secured in an appropriately selected position in accordance with conditions. Moreover, if the backing plate member, for example, contains a piece of wood, it can also absorb vibrations when cutting that may not be suppressed by metal and plastic.

The manufacturing apparatus according to the invention includes a floor plate of a material that can be cut by the cutting blade, provided on the table and supporting a bottom side of the silicon rod or at least one of the plate-like member. According to this configuration, even if the silicon rod or the like is long, since it can be supported midway from below by the floor plate, it can be prevented from flexion warping and can be cut accurately. Also, by using the floor plate to support the silicon rod or the like in a state of floating above the table, and cutting the silicon rod or the like through each floor plate with the cutting blade, the silicon rod or the like can be completely separated. Moreover, when cutting down with the cutting blade, the floor plate can buffer the downward-acting force and prevent the plate-like member from collapsing.

The manufacturing apparatus according to the invention includes, in at least one of the end-face supporting members, an indented groove which can accommodate a rod-like grindstone which dresses the cutting blade in a direction orthogonal to the depth direction of grooves of the end-face supporting members. By accommodating the rod-like grinding stone in the indented groove, the rod-like grindstone is also cut when the silicon rod or the like is cut by the cutting blade, thereby automatically dressing the cutting blade. A dressing step therefore need not be provided separate to the cutting operation, the cutting blade can be kept in good cutting condition, and seeds of accurate sizes can be manufactured.

According to the manufacturing apparatus of the invention, both end faces of a silicon rod are supported in a pressing state by end-face supporting members, and the cutting blade can pass along grooves provided in the end-face supporting members. The cutting blade can cut the silicon rod while traveling along the grooves, and the cut plate-like members can be supported in a pressing state by the end-face supporting members, thereby preventing the plate-like members from tilting and collapsing during cutting, and enabling an accurate cutting operation to be speedily performed. Therefore, seeds can be manufactured with high yield from the silicon rod.

DETAILED DESCRIPTION OF THE INVENTION

An apparatus for manufacturing a seed for polycrystalline silicon manufacture according to an embodiment of the invention will be explained with reference to the drawings.

Figure 1:
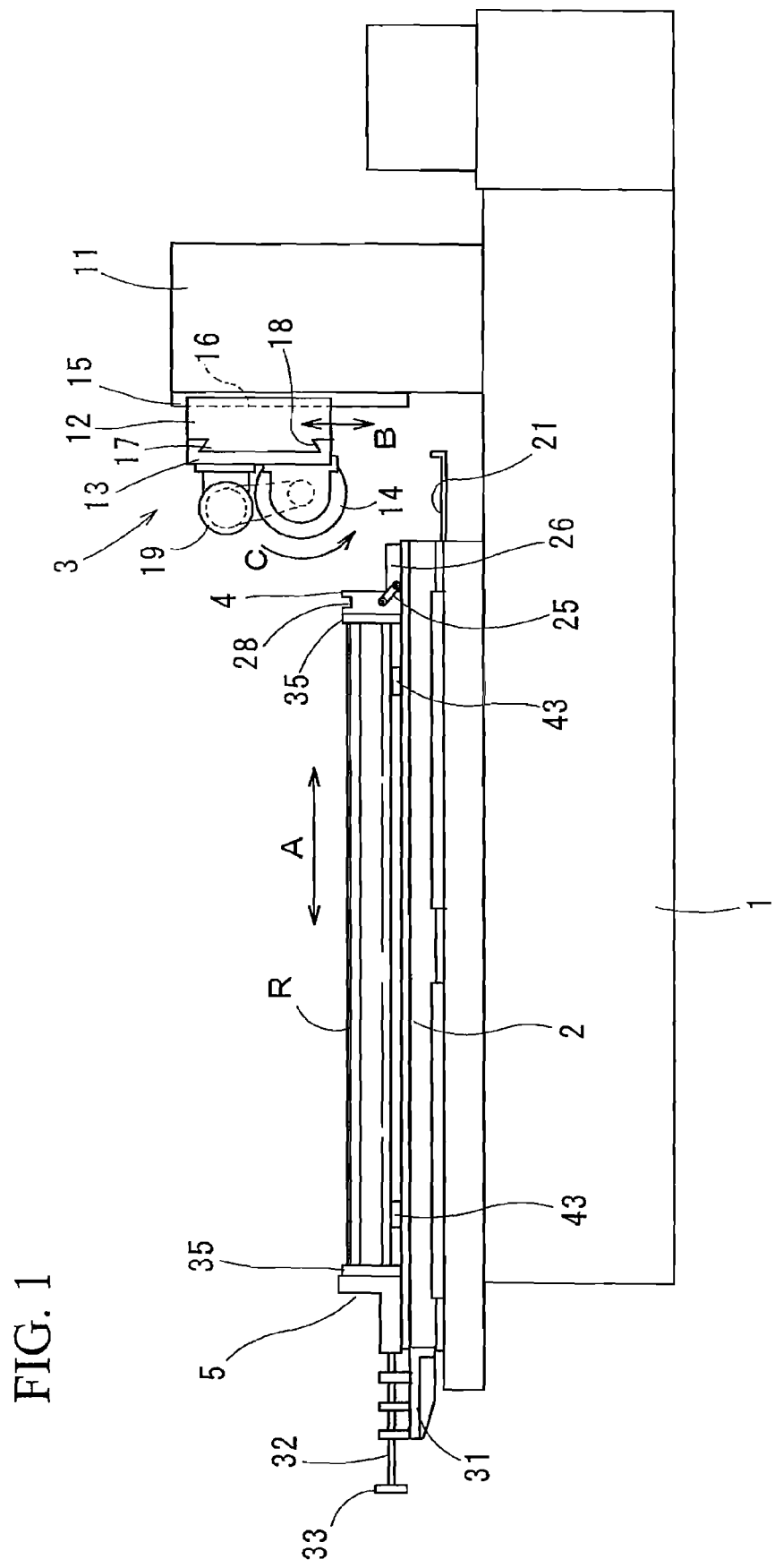
FIG. 1 is a front view of an embodiment of an apparatus for manufacturing a seed for polycrystalline silicon manufacture

As shown in an overall view of FIG. 1, a manufacturing apparatus in this embodiment includes a table 2 that supports a silicon rod R in a mounted state, and a cutting mechanism 3 that cuts the silicon rod R on the table 2, the table 2 and the cutting mechanism 3 being attached to a base 1, and a pair of end-face supporting members 4 and 5 which are provided on the table 2 and support both end faces of the silicon rod R.

Figure 2:
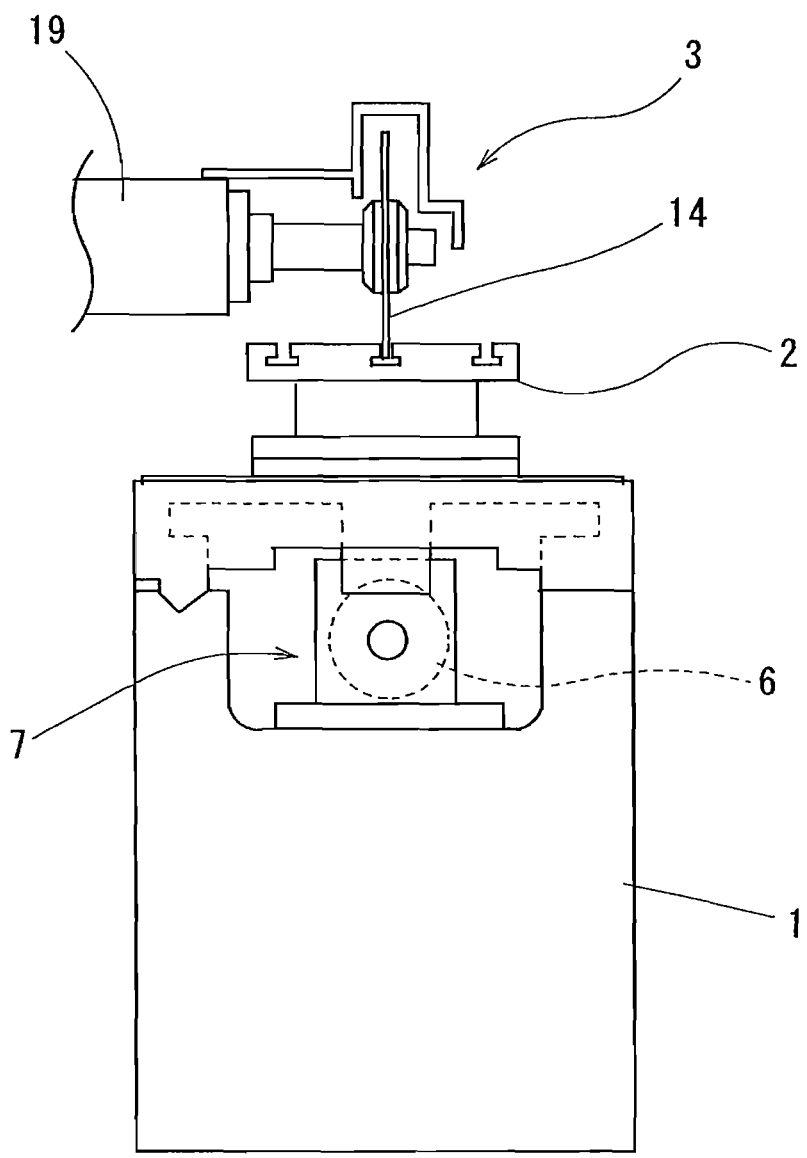
FIG. 2 is a side view of a cutting blade portion of the manufacturing apparatus of FIG. 1.

The table 2 is made of steel, and is attached onto the base 1 via a feeding mechanism 7 in FIG. 2, having a feed screw 6 in FIG. 2, so that it can move back and forth as indicated by arrow A in FIG. 1, and can move back and forth over a distance longer than the length of the silicon rod R such that it cut the entire length of the silicon rod R which is supported by the end-face supporting members 4 and 5.

The cutting mechanism 3 includes a fixed base II which is securely fixed on the base 1, and a cutting blade 14 which is supported via an up-down sliding member 12 and a left-right sliding member 13.

The fixed base 11 is provided in a standing state on the base 1, the up-down sliding member 12 is attached such that it can move up and down with respect to the fixed base 11, and the left-right sliding member 13 is attached such that it can move left and right with respect to the up-down sliding member 12.

In FIG. 1, the up-down sliding member 12 is attached by fitting an indented part 16 into a rail part 15 arranged in the up-down direction, and can slide up and down (the directions indicated by arrow B) with respect to the fixed base 11. The left-right sliding member 13 is attached by fitting an indented part 18 into a rail part 17 arranged in the left-right direction (a perspective direction orthogonal to the paper of FIG. 1) of the up-down sliding member 12, and can move to the left and right (perspective) direction with respect to the up-down sliding member 12.

The up-down sliding member 12 and the left-right sliding member 13 can slide along the rail parts 15 and 17 by means of feeding mechanisms (not shown) provided inside the fixed base 11, operations such as this sliding operation and the automatic feeding of the table 2 being controlled by a control panel (not shown).

The cutting blade 14 that can cut the silicon rod R, and a motor 19 for rotating the cutting blade 14, are attached to the left-right sliding member 13. The cutting blade 14 in this embodiment is formed from a single diamond blade. As shown by arrow C in FIG. 1, the cutting blade 14 is rotated by the motor 19 up and down with respect to the silicon rod R in what is termed the down-cut direction, and it can also be moved to an arbitrary cutting position by the up-down sliding member 12 and the left-right sliding member 13. Operations of switching the rotation of the cutting blade 14 on and off and adjusting its number of rotations are performed at the control panel in the same manner as those of the up-down sliding member 12 and the left-right sliding member 13.

Also, water-injecting nozzles (not shown) are provided on both sides of the cutting blade 14, and enable the cutting blade 14 to be cooled by injecting water to its sides during cutting of the silicon rod R. Water squirted from the water-injecting nozzles flows along a drainage groove 21 provided around the outer peripheral edge of the table 2, and is discharged to the outside.

In addition to the cutting blade 14 of FIG. 2, the manufacturing apparatus in this embodiment includes the multi-cutter 51 with a plurality of cutting blades. As described herein below, after cutting the silicon rod into at least one plate-like member by the cutting blade 14, the cutting blade is exchanged for the multi-cutter 51, and then the plate-like members are cut into plurality of seeds by the multi-cutter 51. This multi-cutter 51 is explained anew at the time of the explanation of the cutting operation.

The end-face supporting members 4 and 5 are arranged on both ends of the table 2, and include a first supporting member 4 on the right side of FIG. 1 and a second supporting member 5 on the left side.

Figure 4A:
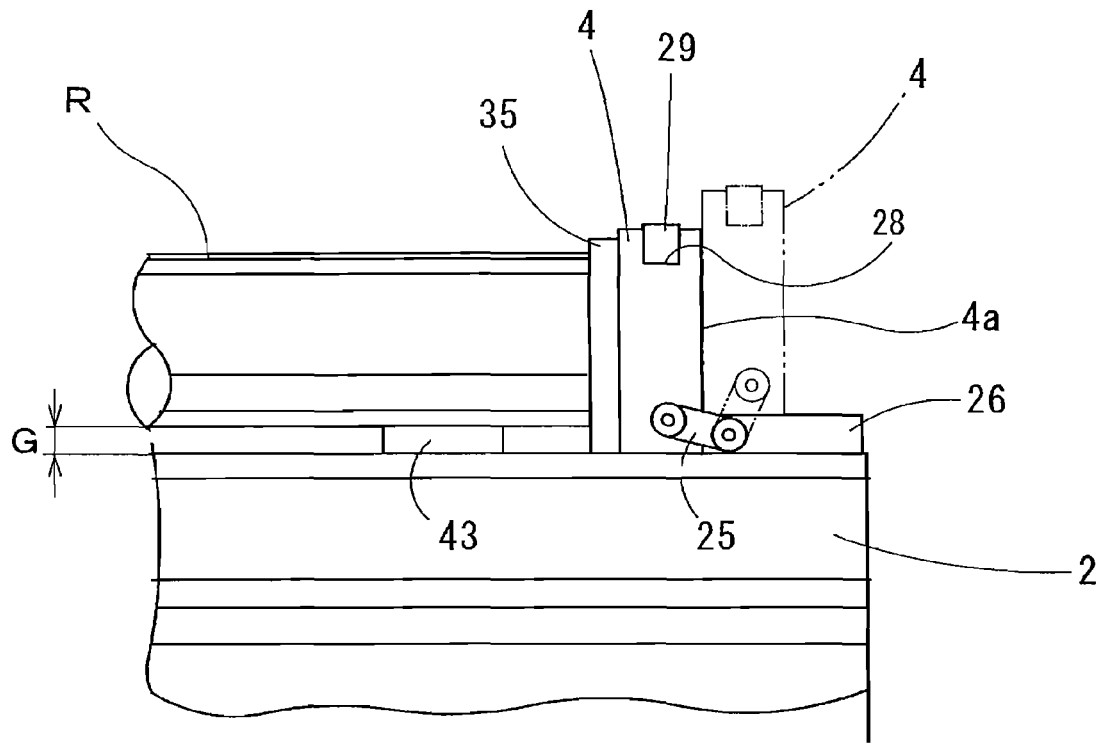
FIG. 4A is an enlarged front view of a vicinity of a first supporting member in FIG. 1.
Figure 4B:
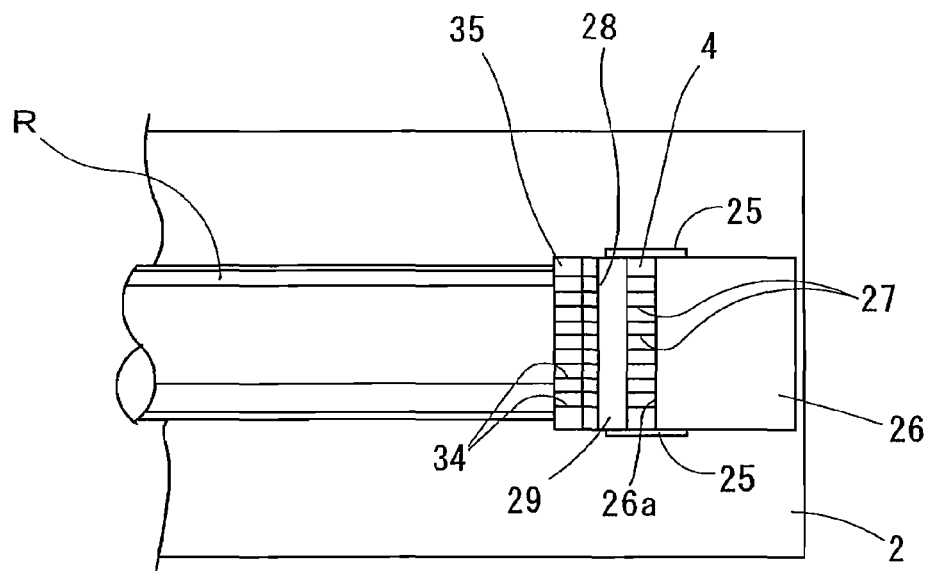
FIG. 4B is a plan view of the same.

The first supporting member 4 shown in FIGS. 4A and 4B has the overall shape of a rectangular block, and its lower part is supported by a supporting base 26 using a link member 25; by rotating the link member 25, the first supporting member 4 can be moved between a position on the supporting base 26 indicated by a dashed line in FIG. 4A and a position on the table 2 indicated by a solid line. When its rear face 4a directly contacts a front face 26a of the supporting base 26, the first supporting member 4 is restricted from moving forward and backward, and becomes capable of supporting one end face of the silicon rod R from the axial direction.

Figure 3:
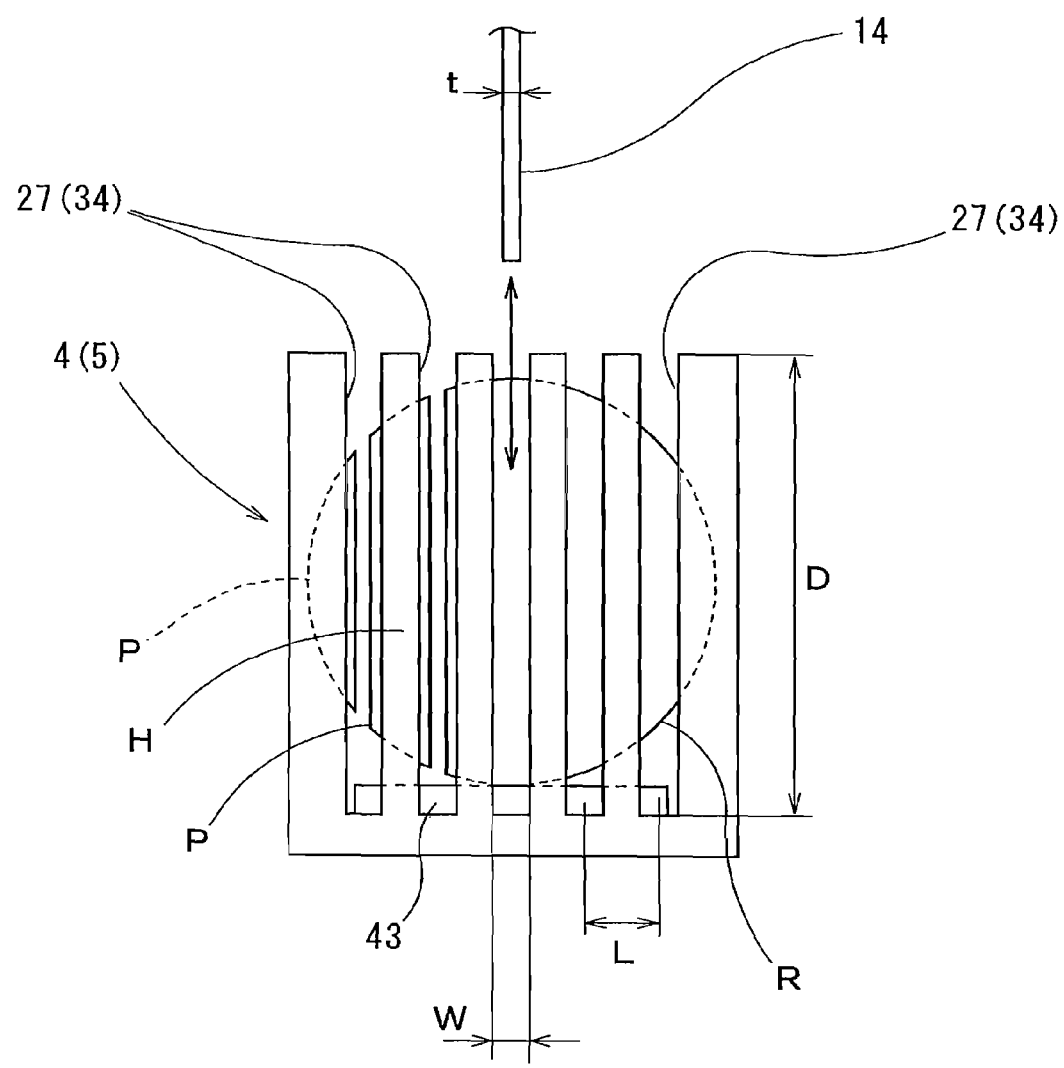
FIG. 3 is an end view of a groove portion of an end-face supporting member in FIG. 1.

As shown in FIG. 3, the first supporting member 4 includes a comb-like groove 27 that is open at the top and arranged along the direction in which the table 2 moves back and forth; the silicon rod R can be cut while passing the cutting blade 14 through this groove 27. The width W of the groove 27 is preferably sufficient to accommodate a slight wobble of the cutting blade 14 during cutting, in addition to the thickness t of the cutting blade 14 itself.

The depth D of the groove 27 is made larger than the diameter of the silicon rod R, whereby the silicon rod R can be reliably cut to its bottom by moving the cutting blade 14 along this depth D.

As shown in FIGS. 1 and 4A and 4B, groove 28 is a slot approximately U-shaped in cross-section, and is provided on a top face part of the first supporting member 4 such as to orthogonal the groove 27 shown in FIG. 4B. A rod-like grindstone 29 can be accommodated or inserted into this groove 28 slot such as to orthogonal the cutting direction of the cutting blade 14, and, when the cutting blade 14 moves in the groove 27 and reaches the rod-like grindstone 29, it continues cutting into the rod-like grindstone 29 such as to perform a dressing process.

Figure 5A:
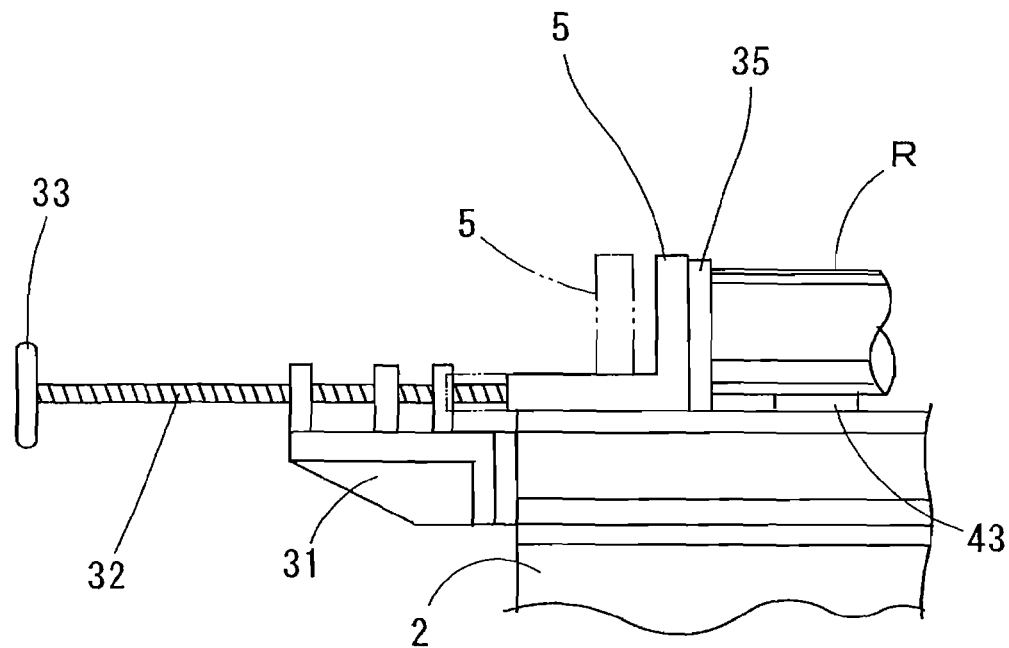
FIG. 5A is an enlarged front view of a vicinity of a second supporting member in FIG. 1.
Figure 5B:
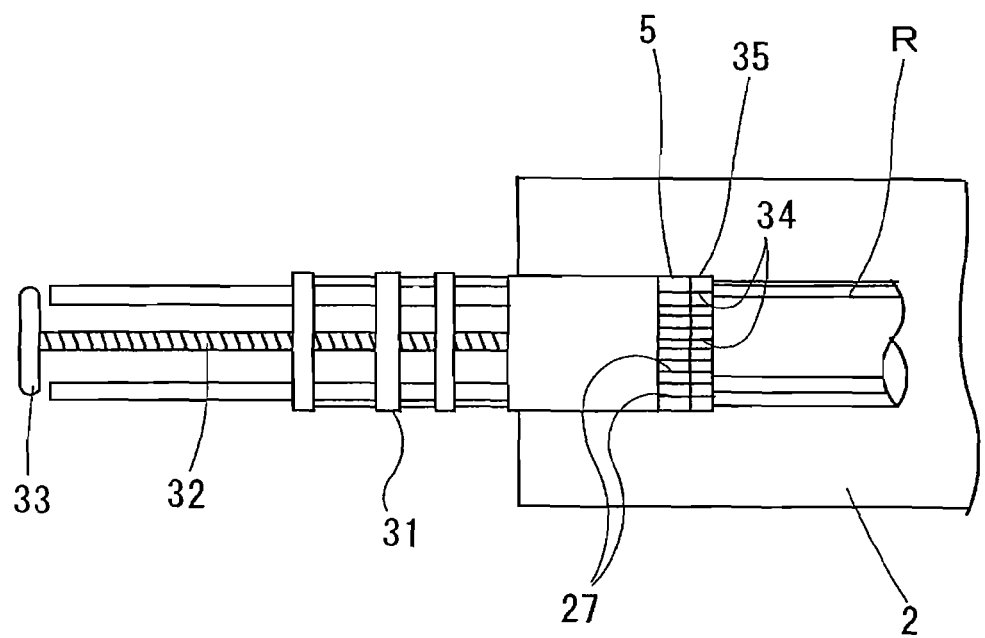
FIG. 5B is a plan view of the same.

The second supporting member 5 shown in FIGS. 5A and 5B has an approximately L-shaped configuration, and can slide forward and backwards along the axial direction with respect to the table 2 between the solid line position and the dashed line position. The second supporting member 5 is attached to a tip of a screw rod 32 that is supported by a fixed bracket 31 such as to elongate the table 2, and, by rotating a handle 33 at a rear end of the screw rod 32, can be moved forwards and backwards in the axial direction. When the second supporting member 5 is moved forward, it abuts to the end face of the silicon rod R and supports it in a pressing state. The silicon rod R is thus supported between the first supporting member 4 and the second supporting member 5.

As in the first supporting member 4, a comb-like groove 34 is provided in the second supporting member 5 at predetermined intervals. The interval and depth of this groove 34 are the same as those of the first supporting member 4, and are not repetitiously explained.

The end-face supporting members 4 and 5 are also fitted with cushion members 35. These cushion members 35 include grooves 34 in FIG. 4B which are approximately the same shape as the grooves 27 and 34 in FIG. 5B in the end-face supporting members 4 and 5. The grooves 34 in FIG. 4B are arranged such as to elongate the grooves 27 and 34 in FIG. 5B of the end-face supporting members 4 and 5, and allow the cutting blade 14 to pass along them. Pieces of wood or plastic are preferably used as the material for the cushion members 35. The cushion members 35 are provided at two places on each end of the silicon rod R, and can absorb vibrations transmitted from the cutting blade 14 when it cuts the silicon rod R.

Figure 6:
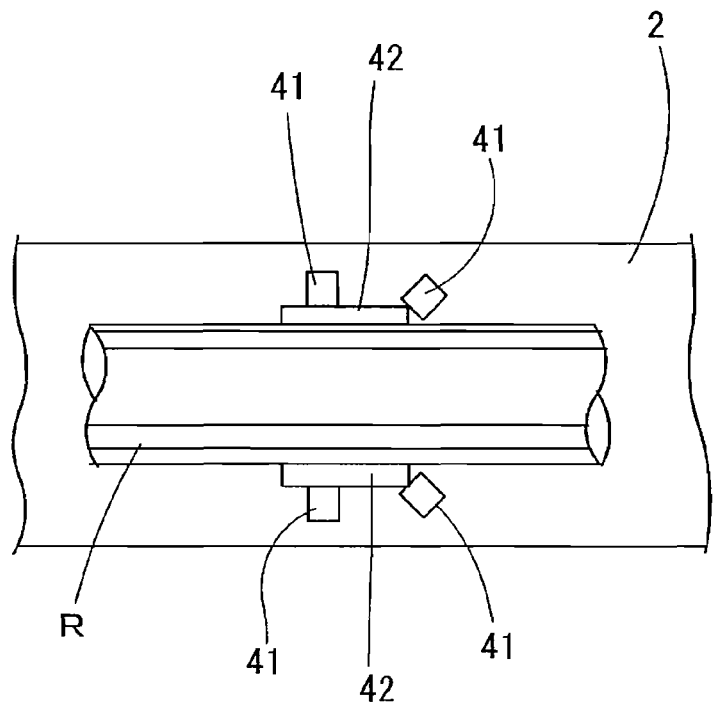
FIG. 6 is a plan view of primary parts in a state where a silicon rod is supported on its left and right sides by magnet members and backing plates in the manufacturing apparatus of FIG. 1.

Backing plates 42 in FIG. 6 are fixed in a state of abutting a side face of the silicon rod R by magnet members 41, and a floor plate 43 that supports the silicon rod R from below, are provided on the table 2.

The magnet members 41 shown in FIG. 6 can be magnetically attached at arbitrary positions on the table 2. By inserting the backing plates 42 between the magnet members 41 and the silicon rod R, and securing them by adjusting the positions of the magnet members 41, the silicon rod R can be supported from the horizontal direction via the backing plates 42 and prevented from generating vibrations in the right-to-left direction. The backing plates 42 are made from pieces of wood such that they can absorb vibration. While the placement directions and positions of the magnet members 41 are arbitrary, they are preferably arranged to the front, rear, left, and right of the backing plates 42 in order to prevent movement in those directions. Vibration of the silicon rod R can be more reliably prevented by combining magnet members 41 and backing plates 42 at a plurality of positions in accordance with the length of the silicon rod R.

The floor plate 43 is arranged beneath the silicon rod R at an appropriate interval thereto such as to allow it to be inserted between the table 2 and the silicon rod R, and the silicon rod R is mounted on the floor plate 43, forming a gap G between the silicon rod R and the table 2 as shown in FIG. 4A. As with the backing plate 42, the floor plate 43 is made from a piece of wood to enable it to absorb vibration, and can be cut by the cutting blade 14 when the cutting blade 14 is slid further downward than the diameter of the silicon rod R.

Subsequently, a procedure of manufacturing a seed by cutting the silicon rod R using this manufacturing apparatus will be explained. The cutting operation sequence described here is merely one example, and can be modified to suit implementation.

Firstly, an appropriate number of floor plates 43 are arranged on the part of the table 2 that supports the silicon rod R, and the end-face supporting members 4 and 5 support the silicon rod R in a pressing state with the cushion members 35 against both its end faces. The backing plate 42 and the magnet members 41 press against both side faces of the silicon rod R, securing it such that its axial core does not vibrate.

In this state, the up-down sliding member 12 and the left-right sliding member 13 feed the cutting blade 14 to a predetermined cutting start position, and rotate it by a predetermined number of rotations. Water-injecting nozzles inject water against the cutting blade, and the feeding mechanism 7 feeds the table 2 along the axial direction, whereby the cutting blade 14 cuts the silicon rod R in a slicing manner. When cutting the silicon rod R in its radial direction, for example, the up-down sliding member 12 is preferably moved downward a plurality of times and the silicon rod R is cut from above four to five times, such as to cut plate-like member P. This prevents the cutting blade 14 from being damaged by an excessive load, and, since it releases residual bending within the rod while it cuts, prevents problems such as bending, burring, and chipping of the plate-like member P.

After cutting out one plate-like member P in this manner, the feeding mechanism horizontally feeds the left-right sliding member 13 along the grooves 27 and 34 of the end-face supporting members 4 and 5 by a pitch L, and plate-like members P are sliced sequentially as above. Since the end-face supporting members 4 and 5 and the cushion members 35 supporting both ends of the silicon rod R respectively include the comb-like grooves 27 and 34 that the cutting blade 14 passes along, even after cutting the plate-like member P, cutting can continue while supporting the remaining silicon rod R and the plate-like member P in the comb portion.

In FIG. 3, the left half of silicon rod R has been cut into plate-like members P while the right half remains uncut; the plate-like members P are divided by the grooves 27 and 34 of the end-face supporting members 4 and 5, and are supported in the comb portion indicated by reference symbol H. Therefore, the plate-like members P are prevented from tilting and collapsing in the gap equivalent to the thickness t of the cutting blade 14 created as the cutting blade 14 passes, whereby the silicon rod R can be reliably and completely cut in its axial direction without the operation being interrupted, and plate-like members P can be precisely cut without damage.

When dressing the cutting blade 14 in this series of cutting operations, if cutting is performed while the rod-like grindstone 29 is accommodated in the indented grooves 28 of the end-face supporting members 4 and 5, the rod-like grindstone 29 can be cut together with the silicon rod R during dressing. Therefore, dressing can be performed together with the cutting operation without interrupting the cutting operation, which is remarkably efficient. Incidentally, since the plate-like member of the final side part of the silicon rod R includes most of the circumferential portion of the silicon rod R, it is not used in seed manufacture.

Figure 7:
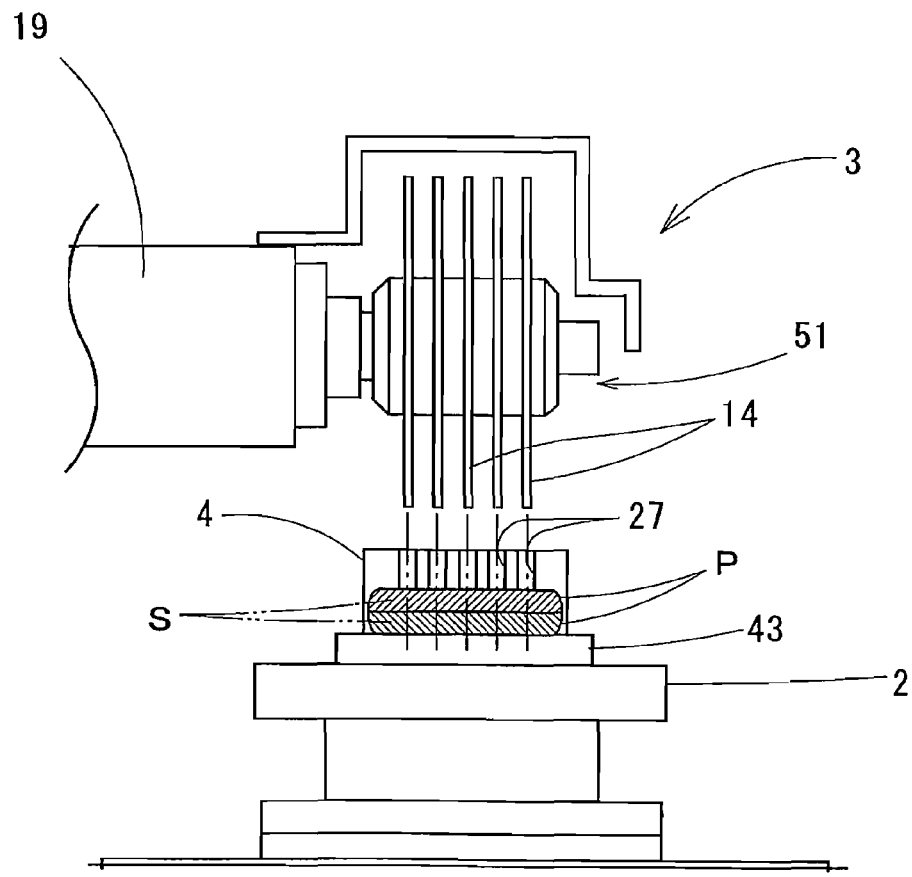
FIG. 7 is a cross-sectional end view of a part of primary parts in an example of a cutting blade exchange for a multi-cutter in the manufacturing apparatus of FIG. 1.

After cutting out the plate-like members P in this manner, they are further cut lengthwise into seeds that are square in cross-section. In this case, the plate-like members P are arranged between the end-face supporting members 4 and 5, and as described above, the plate-like members P is cut in a state where the cutting blade 14 was exchanged in the multi-cutter 51. In the example of FIG.7, this multi-cutter 51 has five cutting blades 14 with same diameter which are arranged horizontal at a regular interval, rotates at the same speed in the same direction by the motor 19, and the plurality of seed can be cut from the plate-like members P at the same time. In this multi-cutter 51, each water-injection nozzle is provided to the cutting blade 14.

While one cutting blade 14 was used in cutting the plate-like members P from the silicon rod R, to produce a plurality of seeds from a plate-like member P, for example, a plurality of horizontal-arranged cutting blades can be used. Preferably, when cutting into seeds, members having cushioning properties are inserted alongside end faces of the plate-like member P, and a floor plate is inserted underneath it. Unlike when cutting the plate-like member P, where a plurality of strokes was made, each seed can be cut with a single stroke. A plurality of plate-like members P can then be piled up by cutting. In the example of FIG.7, two plate-like members P can be piled up by cutting.

The present invention is not limited to the embodiment described above, and various modifications can be made without departing from the spirit or scope of the invention. For example, while in this embodiment the cutting blade 14 is fixed in position and the table 2 is moved back and forth, the table can be kept fixed while the cutting blade is moved back and forth, or both can be moved relative to each other. Furthermore, while the pressing mechanisms using end-face supporting members at both ends of the silicon rod are depicted as different mechanisms, they can be the same mechanism. Furthermore, one end-face supporting member can be placed the pressing mechanisms and the other end can be fixed by the table. Furthermore, in the plurality of cutting apparatus, each can be used as the cutting apparatus for the plate-like members and for the specialized multi-cutter, and can be used without exchanging the cutting blades.

Figure 8:
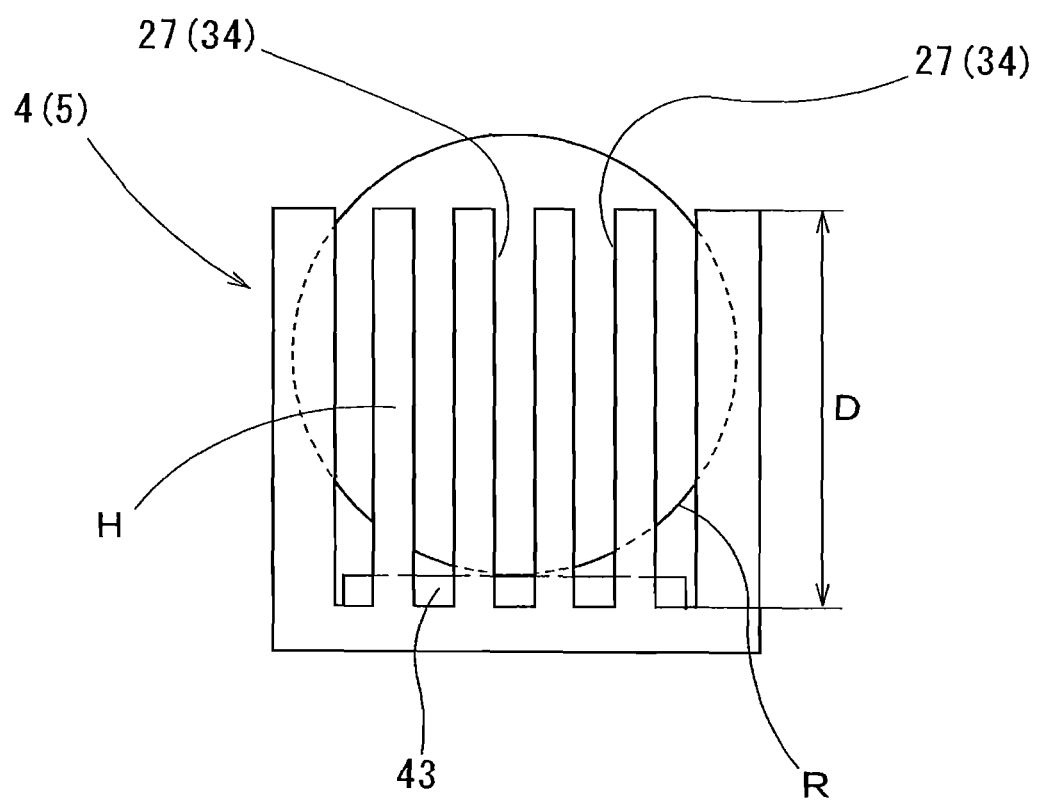
FIG. 8 is an end view, similar to that of FIG. 3, of another embodiment of an end-face supporting member.

Furthermore, while the depth D of the grooves 27 and 34 provided in the end-face supporting members 4 and 5 is larger than the diameter of the silicon rod, if the contact area required to secure the silicon rod is ensured by the comb portion H, the depth of the groove parts need not necessarily be larger than the diameter of the silicon rod; as shown in FIG. 8, the depth of the grooves 27 and 34 can be set to a dimensional relationship that is smaller than the diameter of the silicon rod R (in FIG. 7, like reference symbols as those in the embodiment are used). Moreover, while the indented groove for accommodating the rod-like grinding stone is provided in the first supporting member, it can be provided in the second supporting member instead, or in both, and also in at least one of the end-face supporting members.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for manufacturing seeds for polycrystalline silicon manufacture by cutting a silicon rod in a lengthwise axial direction into at least one plate-shaped member thereof, and cutting at least one of the silicon plate-shaped members lengthwise into seeds that are square in cross section, comprising:
   a table which can mount the silicon rod or at least one of the plate-shaped members;
   a pair of end-face supporting members which can support the silicon rod or at least one of the plate-shaped members by pressing both end faces thereof in the lengthwise axial direction;
   a multi-cutter comprising a horizontally-arranged plurality of rotable cutting blades that simultaneously cut a plurality of portions arranged at intervals in the width direction of the plate-shaped members, and
   wherein the end-face supporting members include comb-shaped grooves that allow the cutting blades to pass through, and
   wherein the comb-shaped grooves are provided at the same intervals as the plurality of cutting blades.

2. The apparatus for manufacturing seeds for polycrystalline silicon manufacture according to claim 1, further comprising cushion members inserted between the silicon rod or at least one of the plate-shaped members and the end-face supporting members,
   wherein the cushion member includes grooves having approximately the same shape as the comb-shaped grooves.

3. The apparatus for manufacturing seeds for polycrystalline silicon manufacture according to claim 1, further comprising at least one magnet member that is magnetically attached to the table and at least one backing plate member that is inserted between this magnet member and a side face of the silicon rod or at least one of the plate-shaped members.

4. The apparatus for manufacturing seeds for polycrystalline silicon manufacture according to claim 1, further comprising at least one floor plate of a material that can be cut by the cutting blade, provided on the table and supporting a bottom face of the silicon rod or at least one of the plate-shaped members.

5. The apparatus for manufacturing seeds for polycrystalline silicon manufacture according to claim 1, comprising, in at least one of the end-face supporting members, an indented groove which can accommodate a rod-shaped grindstone which dresses the cutting blade in a direction orthogonal to the depth direction of grooves of the end-face supporting members.

* * * * *